US012531970B2

(12) United States Patent
Nan

(10) Patent No.: US 12,531,970 B2
(45) Date of Patent: Jan. 20, 2026

(54) METHOD AND APPARATUS FOR ADJUSTING SKIN COLORS OF PORTRAIT, ELECTRONIC DEVICE AND STORAGE MEDIUM

(71) Applicant: Black Sesame Technologies Co., Ltd., Wuhan (CN)

(72) Inventor: Yuanyuan Nan, Wuhan (CN)

(73) Assignee: Black Sesame Technologies Co., Ltd. (CN)

(*) Notice: Subject to any disclaimer, the term of this patent is extended or adjusted under 35 U.S.C. 154(b) by 352 days.

(21) Appl. No.: 18/209,915

(22) Filed: Jun. 14, 2023

(65) Prior Publication Data

US 2023/0412784 A1   Dec. 21, 2023

(30) Foreign Application Priority Data

Jun. 15, 2022   (CN) .......................... 202210681655.4

(51) Int. Cl.
*G06T 7/90* (2017.01)
*H04N 9/64* (2023.01)

(52) U.S. Cl.
CPC ............... *H04N 9/643* (2013.01); *G06T 7/90* (2017.01); *G06T 2207/10024* (2013.01); *G06T 2207/20076* (2013.01); *G06T 2207/30201* (2013.01)

(58) Field of Classification Search
CPC .......... H04N 9/643; H04N 1/628; G06T 7/90; G06T 2207/10024; G06T 2207/20076;
(Continued)

(56) References Cited

U.S. PATENT DOCUMENTS 5,341,464 A * 8/1994 Friedman ............... G06T 11/001
345/600
2007/0183656 A1 * 8/2007 Kuwahara ................ H04N 1/62
382/162
(Continued)

FOREIGN PATENT DOCUMENTS

CN     104156915 A     11/2014
CN     107437072 A     12/2017
(Continued)

OTHER PUBLICATIONS

Ronneberger O , Fischer P , Brox T . U-Net: Convolutional Networks for Biomedical Image Segmentation[J]. Springer, Cham, 2015.
(Continued)

*Primary Examiner* — Ali Bayat
(74) *Attorney, Agent, or Firm* — Timothy T. Wang; Ni, Wang & Massand, PLLC

(57) ABSTRACT

A method and an apparatus for adjusting skin colors of a portrait, an electronic device and a storage medium are provided. The method includes: acquiring an initial portrait image to be adjusted; determining multiple skin color category probabilities that the initial portrait image respectively belongs to multiple predetermined skin color categories; calculating a mapped pixel value of each pixel in the initial portrait image according to the multiple skin color category probabilities and multiple skin color mapping tables respectively corresponding to the multiple skin color categories; and determining a skin color beautified image based on the mapped pixel value of each pixel. With the method, the skin color adjustment can be flexibly and accurately adapted to various skin color conditions.

9 Claims, 7 Drawing Sheets

(58) Field of Classification Search
CPC . G06T 2207/30201; G06T 2207/20081; G06T 2207/20084; G06T 2207/30088; G06T 7/70; G06T 2207/30196; G06V 10/764; G06V 10/774; G06V 10/82
USPC .......................................................... 382/167
See application file for complete search history.

(56) References Cited

U.S. PATENT DOCUMENTS

| | | | | |
|---|---|---|---|---|
| 2008/0123945 | A1* | 5/2008 | Andrew | G06V 30/413 382/164 |
| 2010/0158357 | A1* | 6/2010 | Hung | H04N 1/62 382/162 |
| 2015/0325023 | A1* | 11/2015 | Gross | G06T 7/90 382/203 |
| 2016/0086355 | A1 | 3/2016 | Zhang et al. | |
| 2017/0287150 | A1* | 10/2017 | Thivin | G06T 3/4015 |
| 2021/0027497 | A1* | 1/2021 | Ding | G06T 7/11 |

FOREIGN PATENT DOCUMENTS

| | | |
|---|---|---|
| CN | 110443769 A | 11/2019 |
| CN | 110753217 A | 2/2020 |
| CN | 113763258 A | 12/2021 |
| CN | 114500969 A | 5/2022 |
| JP | 2005222304 A | 8/2005 |
| WO | 2018082389 A1 | 5/2018 |

OTHER PUBLICATIONS

Yang Jing-feng, Fu Zhou-yu, Tan Tie-niu, Hu Wei-ming, A novel algorithm for content-based image recognition and filtering, Journal of China Institute of Communications, vol. 25 No. 7, Jul. 2024.
Sangho Yoon, etc., Automatic Skin Pixel Selection and Skin Color Classification, 2006 International Conference on Image Processing, Feb. 20, 2007.

* cited by examiner

Figure 5

METHOD AND APPARATUS FOR ADJUSTING SKIN COLORS OF PORTRAIT, ELECTRONIC DEVICE AND STORAGE MEDIUM

FIELD OF THE INVENTION

The present disclosure relates to the technical field of image processing, and in particular to a method and an apparatus for adjusting skin colors of a portrait, an electronic device and a storage medium.

BACKGROUND OF THE INVENTION

The image beautification technology is used to beautify a portrait in an image, making the beautified portrait more in line with the aesthetics of human eyes. In a beautification process, the skin color of the portrait often needs to be adjusted. Conventional beautification treatments generally only whiten and brighten the skin. However, there are huge differences in skin colors of different races or different individuals. If adopting a fixed whitening treatment, it may be difficult to achieve the ideal beauty effect for some skin colors.

A solution of a beautification product is to use different skin color adjustment strategies for different regions. For example, in an Asian region, the skin color of a portrait is adjusted to be bright, white and rosy, while in an African region, the skin color of a portrait is adjusted to be black and bright, to meet the skin color preference of dark color races. However, this method cannot always be accurately performed for different skin types of users, and thus is not flexible and accurate.

Therefore, the existing skin color adjustment methods still need to be improved.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need to . . . .

SUMMARY OF THE INVENTION

In view of above technical problems, a method and an apparatus for adjusting skin colors of a portrait, an electronic device and a storage medium are provided to flexibly and accurately adjusting skin colors of a portrait.

A method for adjusting skin colors of a portrait includes:
   acquiring an initial portrait image to be adjusted;
   determining multiple skin color category probabilities that the initial portrait image respectively belongs to multiple skin color categories predetermined;
   calculating a mapped pixel value of each pixel in the initial portrait image according to the multiple skin color category probabilities and multiple skin color mapping tables respectively corresponding to the multiple skin color categories; and
   determining a skin color beautified image based on the mapped pixel value of each pixel.

In an embodiment, the calculating the mapped pixel value of each pixel in the initial portrait image according to the multiple skin color category probabilities and the multiple skin color mapping tables respectively corresponding to the multiple skin color categories includes: acquiring the multiple skin color mapping tables respectively corresponding to the multiple skin color categories; determining, for each pixel in the initial portrait image, multiple skin color mapped values by mapping an original pixel value of the pixel respectively according to the multiple skin color mapping tables; and determining the mapped pixel value of each pixel by using the multiple skin color categories probabilities as weights to perform a weighted summation on the multiple skin color mapped values.

In an embodiment, the determining the skin color beautified image based on the mapped pixel value of each pixel includes: determining, for each pixel in the initial portrait image, a skin probability that the pixel belongs to skin; and determining a skin color beautified pixel value of each pixel based on the skin probability of each pixel and the mapped pixel value of each pixel, to determine the skin color beautified image.

In an embodiment, each of the multiple skin color mapping tables records mapping relationships between pixel values before being skin color mapped and pixel values after being skin color mapped under a corresponding skin color category.

In an embodiment, pixel values in each of the skin color mapping tables are expressed in a RGB color space; and each of the skin color mapping tables in the RGB color space recodes R values, G values and B values of multiple pixel values before being skin color mapped, and R values, G values and B values of the multiple pixel values after being skin color mapped.

In an embodiment, the R values, the G values and the B values of the pixel values before being skin color mapped in each of the skin color mapping tables are respectively compressed by a predetermined ratio.

In an embodiment, pixel values in each of the skin color mapping tables are expressed in a YUV color space; and each of the skin color mapping tables in the YUV color space recodes Y values of multiple pixel values before being skin color mapped, and Y values of the multiple pixel values after being skin color mapped, and recodes Cb values and Cr values of the multiple pixel values before being skin color mapped, and Cb values and Cr values of the multiple pixel values after being skin color mapped.

In an embodiment, the Cb values and Cr values of the pixel values before being skin color mapped in each of the skin color mapping tables are respectively limited in a predetermined Cb value range and a predetermined Cr value range.

In an embodiment, an apparatus for adjusting skin colors of a portrait includes:
   an image acquisition module, configured to acquire an initial portrait image to be adjusted;
   a skin color category probability determination module, configured to determine multiple skin color category probabilities that the initial portrait image respectively belongs to multiple skin color categories predetermined;
   a mapped pixel value determination module, configured to calculate a mapped pixel value of each pixel in the initial portrait image according to the multiple skin color category probabilities and multiple skin color mapping tables respectively corresponding to the multiple skin color categories; and
   a skin color beautified image determination module, configured to determine a skin color beautified image based on the mapped pixel value of each pixel.

An electronic device includes a memory and a processor, where the memory stores a computer program, and the processor, when executing the computer program, performs the following steps:

acquiring an initial portrait image to be adjusted;
determining multiple skin color category probabilities that the initial portrait image respectively belongs to multiple skin color categories predetermined;
calculating a mapped pixel value of each pixel in the initial portrait image according to the multiple skin color category probabilities and multiple skin color mapping tables respectively corresponding to the multiple skin color categories; and
determining a skin color beautified image based on the mapped pixel value of each pixel.

A computer-readable storage medium stores a computer program, where the computer program is used to, when being executed by a processor, perform performs the following steps:

acquiring an initial portrait image to be adjusted;
determining multiple skin color category probabilities that the initial portrait image respectively belongs to multiple skin color categories predetermined;
calculating a mapped pixel value of each pixel in the initial portrait image according to the multiple skin color category probabilities and multiple skin color mapping tables respectively corresponding to the multiple skin color categories; and
determining a skin color beautified image based on the mapped pixel value of each pixel.

In the above method and apparatus for adjusting skin colors of a portrait, the electronic device and the storage medium, instead of using a single skin color mapping table, multiple skin color mapping tables corresponding to multiple predetermined skin color categories are used according to multiple skin color category probabilities of the detected portrait image, to smoothly and comprehensively adjust the skin colors of the portrait according to different skin color conditions of the portrait, so that the skin color adjustment can be flexibly and accurately adapted to various skin color conditions.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 5 is a schematic diagram of a three-dimensional skin color mapping table under the RGB color space according to an embodiment.

DETAILED DESCRIPTION OF THE INVENTION

Figure 1:
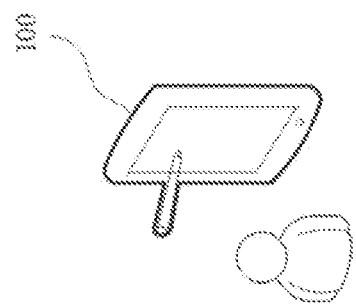
FIG. 1 is a diagram showing an application environment of method for adjusting skin colors of a portrait according to an embodiment.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

In order to make the purpose, technical solution and advantages of the present disclosure clearer, the technical solutions will be further described in detail below in conjunction with the accompanying drawings and embodiments. It should be understood that the specific embodiments described here are only used for illustration, rather than limitation.

There are two types of skin color adjustment technologies. The first type is to directly perform fixed color adjustment on the whole image or the skin area in the image without recognizing the specific skin color of the portrait in the image, which is normally achieved by a curve adjustment method, i.e., adjusting a brightness curve, a chromaticity curve, and a saturation curve of the image to achieve brightening, rosiness, and whitening effects. The second type is to simply recognize people of different skin colors, i.e., first determining whether the portrait in the currently processed image belongs to the white race, the yellow race, or the dark color race, and then selecting different skin color adjustment curves to achieve different skin color adjustment for different races.

The first type adopts the fixed adjustment of skin color curve for different skin colors, which cannot achieve differentiated beautification effects, and thus cannot meet the beauty needs of different races. The second type can achieve personalized processing of different skin colors to some extent, but lacks flexibility. In practices, due to individual differences in skin color and changes in ambient light, the skin colors in some images are between colors of different skin types. In this case, the use of a curve for any one of the skin type still cannot achieve the desired effect.

In view of the defects existing in the aforementioned skin color adjustment technologies, a method for adjusting skin colors of a portrait is provided, which can flexibly and accurately provide adaptive adjustment for different skin colors.

The method for adjusting skin colors of a portrait provided in the present disclosure may be applied to an electronic device 100 as shown in FIG. 1. The electronic device 100 may be, but not limited to, various personal computers, notebook computers, smart phones, tablet computers and portable wearable devices. The electronic device 100 can execute the method for adjusting skin colors of a portrait in any embodiment of the present disclosure, to adjust skin colors of the initial portrait image to be adjusted, and output the skin color beautified image in which the skin colors are adjusted. The electronic device 100 may include a camera, and may obtain the initial portrait image to be adjusted by shooting in real time using the camera. The electronic device 100 may also include a display screen, and may perform the method for adjusting skin colors of a portrait according to the embodiment of the present disclosure on the initial portrait image to be adjusted in real time to obtain a skin color beautified image, and display the obtained skin color beautified image on the display screen for users to review.

Figure 2:
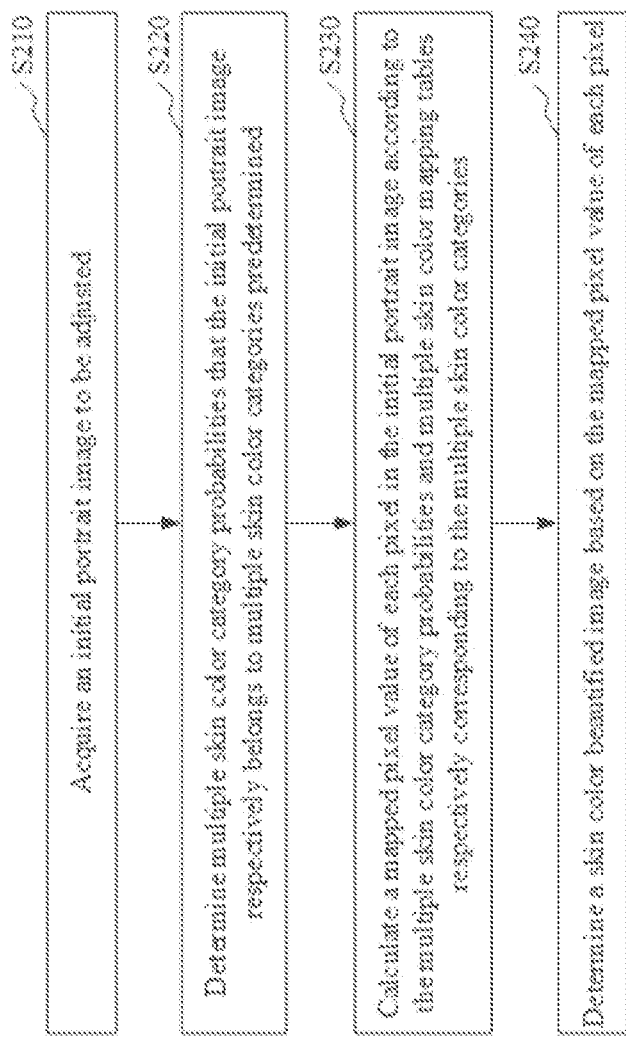
FIG. 2 is a schematic flow chart of a method for adjusting skin colors of a portrait according to an embodiment.

In an embodiment, as shown in FIG. 2, a method for adjusting skin colors of a portrait is provided. An example that the method is applied to the electronic device 100 in FIG. 1 is described for illustration. The method includes the following steps S210 to S240.

In step S210, an initial portrait image to be adjusted is acquired.

The initial portrait image is an image in which the skin colors are to be adjusted. The initial portrait image may be, for example, an image captured by the electronic device 100 or an external device. The initial portrait image may include a portrait. Each pixel in the initial portrait image may have a corresponding original pixel value $Value_{color}$.

In step S220, multiple skin color category probabilities that the initial portrait image respectively belongs to multiple predetermined skin color categories are determined.

For example, four typical skin color categories may be predetermined, namely a white skin color category, a yellow skin color category, a brown skin color category, and a black skin color category. It can be understood that the above skin color categories are only examples, and in other examples, more or less or different skin color categories may be set.

The skin color category probability that the skin color of the portrait in the initial portrait image respectively belongs to the predetermined multiple skin color categories may be calculated by a neural network algorithm. For example, in this step, the initial portrait image may be input into a pre-trained skin color classification neural network model, which will output the skin color category probabilities that the skin color of the portrait in the initial portrait image respectively belongs to the skin color categories. The skin color classification neural network model may be trained by using a training set including multiple pairs of portrait images and corresponding skin color categories among various skin color categories. For example, in the example having the above four typical skin color categories, after the initial portrait image is input into the pre-trained skin color classification neural network model, the skin color classification neural network model outputs the skin color category probability $p_{White}$ that the skin color of the initial portrait image belongs to the white skin color category, the skin color category probability $p_{Yellow}$ that the skin color of the initial portrait image belongs to the yellow skin color category, the skin color category probability $p_{Brown}$ that the skin color of the initial portrait image belongs to the brown skin color category, and the skin color category probability $p_{Black}$ that the skin color of the initial portrait image belongs to the black skin color category. In some embodiments, the sum of the skin color category probabilities can be set to 1, so that the skin color category probabilities can be used as weights to carry out weighted calculations on the mapped pixel values. For example, in the example having the above four typical skin color categories, there may be $p_{White} + p_{Yellow} + p_{Brown} + p_{Black} = 1$.

In some alternative embodiments, a skin mask (Mask) region may be detected and extracted from the initial portrait image by a neural network algorithm, and instead of the initial portrait image, only the image of the skin mask (Mask) region is input into the pre-trained skin color classification neural network model. The skin color classification neural network model may be trained by using a training set including multiple pairs of the skin mask region images and corresponding skin color categories among various skin color categories. In this way, the skin color category probabilities that the skin color of the portrait in the initial portrait image respectively belongs to the multiple predetermined multiple skin color categories can be more accurately determined.

Those skilled in the art can understand that the above skin color classification neural network model can be implemented by any suitable neural network model with a classification function, which will not be described in detail herein.

In step S230, a mapped pixel value of each pixel in the initial portrait image is calculated according to the multiple skin color category probabilities and multiple skin color mapping tables respectively corresponding to the multiple skin color categories.

In this step, the multiple skin color category probabilities may be used as weights, to calculate the mapped pixel value of each pixel in the initial portrait image based on multiple skin color mapping tables respectively corresponding to the multiple skin color categories.

In an embodiment, step S230 includes: acquiring the multiple skin color mapping tables respectively corresponding to the multiple skin color categories; determining, for each pixel in the initial portrait image, multiple skin color mapped values by mapping an original pixel value of the pixel respectively according to the multiple skin color mapping tables; and determining the mapped pixel value of each pixel by using the multiple skin color categories probabilities as weights to perform a weighted summation on the multiple skin color mapped values.

Before performing step S230, M skin color mapping tables may be created and stored respectively for M skin color categories, so as to be used in Step 230, where M is a positive integer. Each of the M skin color mapping tables records mapping relationships between pixel values before being skin color mapped and pixel values after being skin color mapped under a corresponding skin color category, that is, recoding what the various pixel values should be mapped to in a mapping process for a skin beauty effect. For example, in the example having the above four typical skin color categories, the following skin color mapping table may be created: the skin color mapping table $LUT_{White}$ corresponding to the white skin color, the skin color mapping table $LUT_{Yellow}$ corresponding to the yellow skin color, the skin color mapping table $LUT_{Brown}$ corresponding to the brown skin color, and the skin color mapping table $LUT_{Black}$ corresponding to the black skin color. For the portrait image of each skin color category, each pixel in the skin color area can show a skin color beautification effect after being mapped according to the skin color mapping table. The specific pixel values before and after being mapped can be obtained by professional artist.

In the example having the above four typical skin color categories, skin color mapped values $NewValue_{White}$, $NewValue_{Yellow}$, $NewValue_{Brown}$ and $NewValue_{Black}$ are acquired by mapping an original pixel value $Value_{color}$ of each pixel respectively according to the skin color mapping tables $LUT_{White}$, $LUT_{Yellow}$, $LUT_{Brown}$ and $LUT_{Black}$ as follows:

$$NewValue_{White} = LUT_{White}(Value_{color}) \quad \text{Equation 1}$$

$$NewValue_{Yellow} = LUT_{Yellow}(Value_{color}) \quad \text{Equation 2}$$

$$NewValue_{Brown} = LUT_{Brown}(Value_{color}) \quad \text{Equation 3}$$

$$NewValue_{Black} = LUT_{Black}(Value_{color}) \quad \text{Equation 4}$$

Then, the skin color category probabilities $p_{White}$, $p_{Yellow}$, $p_{Brown}$ and $p_{Black}$ are used as weights to perform a weighted summation on the four skin color mapped values $NewValue_{White}$, $NewValue_{Yellow}$, $NewValue_{Brown}$ and $NewValue_{Black}$ of each pixel $Value_{color}$, to determine a mapped and blended pixel value $NewValue_{blend}$ of each pixel $Value_{color}$, which is expressed as follows:

$$+p_{Brown}*NewValue_{Brown} + p_{Black}*NewValue_{Black} \quad \text{Equation 5}$$

In step S240, a skin color beautified image is determined based on the mapped pixel value of each pixel.

In an embodiment, the mapped pixel value of each pixel can be directly used as the pixel value of each pixel in the skin color beautified image, thereby directly determining the skin color beautified image for output.

Figure 3:
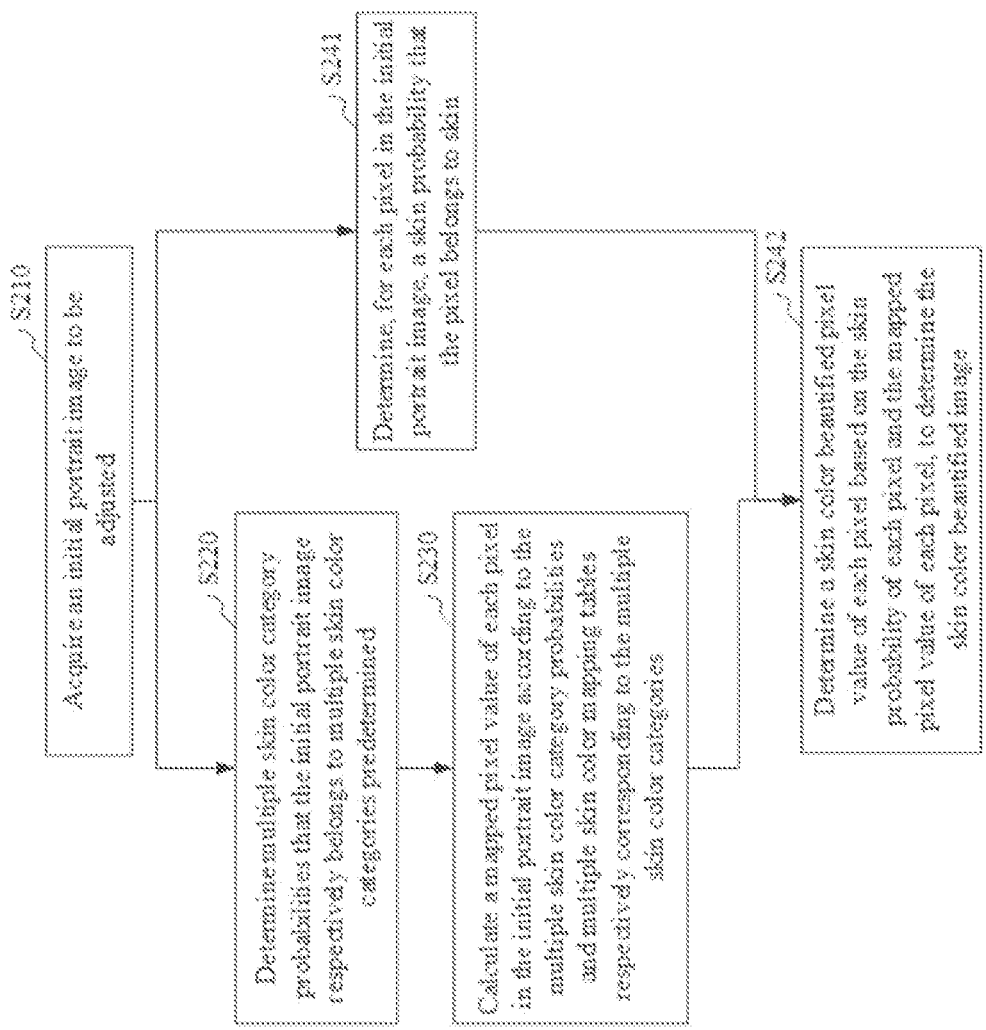
FIG. 3 is a schematic flow chart of a method for adjusting skin colors of a portrait according to an embodiment.
Figure 4:
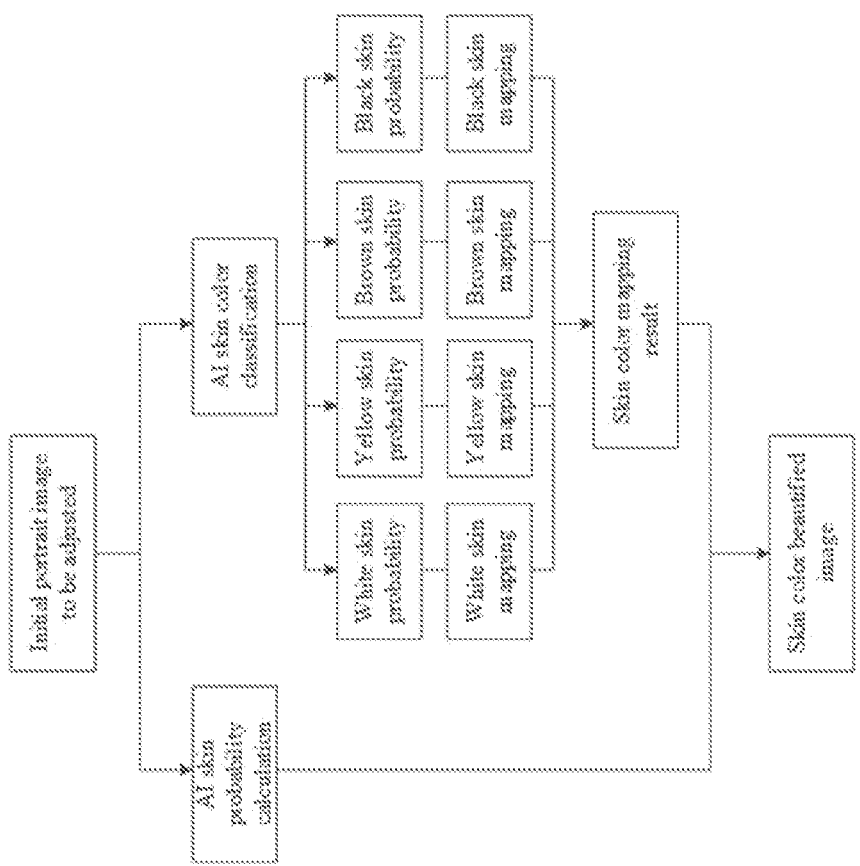
FIG. 4 is a schematic flow chart of a method for adjusting skin colors of a portrait according to an embodiment.

In another embodiment, the pixel value of each pixel can be further adjusted according to whether each pixel in the skin color beautified image belongs to skin. Referring to FIGS. 3 and 4, in this embodiment, step S240 may include steps S241 to S242.

In step S241, for each pixel in the initial portrait image, a skin probability that the pixel belongs to skin is determined.

In this step, a skin mask (Mask) region may be detected from the initial portrait image by a neural network algorithm, so as to determine a skin probability of belonging to skin for each pixel in the initial portrait image. For example, in this step, the initial portrait image may be input into a pre-trained skin detection neural network model, which will output the skin probability of belonging to skin for each pixel in the initial portrait image. For example, after inputting the initial portrait image into the pre-trained skin color classification neural network model, the skin color classification neural network model can output the skin probability $p_{(x,y)}^{skin}$ of belonging to the skin for each pixel (x, y) in the initial portrait image.

Those skilled in the art can understand that the above skin detection neural network model can be implemented by using any suitable neural network model, such as the U-NET network structure disclosed in the technical literature Ronneberger O, Fischer P, Brox T.U-Net: Convolutional Networks for Biomedical Image Segmentation[J]. Springer, Cham, 2015, to detect the skin region from the inputted initial portrait image, and output the distribution of probabilities of belonging to skin for pixels in the initial portrait image.

In step S242, a skin color beautified pixel value of each pixel is determined based on the skin probability of each pixel and the mapped pixel value of each pixel, to determine the skin color beautified image.

In this step, for each pixel, a weighted sum of the original pixel value and the mapped pixel value is calculated by using the skin probability as a weight, so that the greater the skin probability of the pixel is, the closer the skin color beautified pixel value of the pixel is to the mapped pixel value, and the smaller the skin probability of the pixel is, the closer the pixel value of the skin color beautified pixel value is to the original pixel value. If the skin probability of a pixel is of the maximum value (for example, 1), the skin color beautified pixel value of the pixel is equal to the mapped pixel value, and if the skin probability of the pixel is of the minimum value (for example, 0), the skin color beautified pixel value of the pixel is equal to the original pixel value.

In the example having the above four typical skin color categories, the skin color beautified pixel value NewValue$_{Beauty}$ of each pixel may be calculated based on the skin probability $$p_{(x,y)}^{skin}$$

of each pixel, the original pixel value Value$_{color}$ of each pixel and the mapped pixel value NewValue$_{blend}$ of each pixel as follows:

$$NewValue_{Beauty} = Value_{color} + (NewValue_{blend} - Value_{color}) * p_{(x,y)}^{skin} \quad \text{Equation 6}$$

The skin probability $$p_{(x,y)}^{skin}$$

is in the range of [0, 1]. As can be seen from the above equation, if the skin probability $$p_{(x,y)}^{skin} = 1,$$

the skin color beautified pixel value NewValue$_{Beauty}$ is equal to the mapped pixel value NewValue$_{blend}$, and if the skin probability $$p_{(x,y)}^{skin} = 0,$$

the skin color beautified pixel value NewValue$_{Beauty}$ is equal to the original pixel value Value$_{color}$. In this way, only the skin region in the image is subjected to the skin beautification process, without affecting the display effect of the other regions of the image.

In each of the above embodiments of the present disclosure, before step S230, M skin color mapping tables respectively corresponding to the M skin color categories need to be created in advance. Each skin color mapping table records mapping relationships between pixel values before being skin color mapped and pixel values after being skin color mapped under a corresponding skin color category. Each skin color mapping table may record N pixel values before being skin color mapped, and corresponding pixel values after being skin color mapped. Therefore, for any pixel to be mapped, the pixel value before being mapped corresponding to the pixel value of the pixel to be mapped can be found from the skin color mapping table, and then the corresponding pixel value after being skin color mapped can be found from the table, which is used as the mapped pixel value of the pixel to be mapped. The pixel values in the skin color mapping table can be expressed in various color spaces. For example, the pixel values before and after being mapped can be expressed in the RGB, CMY/CMYK, HSI, HSV, HSB, Lab, YUV or other color space.

In an embodiment, the pixel values in each of the multiple skin color mapping tables are expressed in the RGB color space.

In the RGB color space, each pixel value includes three channels of red (R) value, green (G) value, and blue (B) value, and each of the R value, G value, and B value is in an original value range from 0 to 255. The skin color mapping table under the RGB color space records the R values, G values and B values of N1 pixel values before being skin color mapped, and the R values, G values and B values of each pixel value after being skin color mapped, where N1 is a positive integer. For any pixel to be mapped, the R value, G value and B value of the original pixel value Value$_{color}$ of the pixel can be used as the R value, G value and B value of the pixel value before being mapped. The skin color mapping table is used to look up the R value, G value and B value of the mapped pixel value corresponding to the R value, G value and B value of the pixel value before being mapped.

Furthermore, in an embodiment, the R values, G values and B values of the pixel values before being skin color mapped in each skin color mapping table may be compressed by a predetermined ratio.

The compressing the R values, G values and B values by the predetermined ratio refers to compressing the original value range of 0 to 255 of R values, G values and B values by the predetermined ratio X to a compressed value range of 0 to [255/X], where X>1, and [ ] represents rounding down. In the original value range of 0 to 255, the R values, G values and B values in each skin color mapping table each have 256 different values, so that the skin color mapping table needs to totally record 256*256*256=16777216 pixel values before being mapped and their corresponding 16777216 pixel values after being mapped, which results in a high memory occupation and a high computation cost. After compressing the range by the predetermined ratio X to the compressed value range of 0 to [255/X] in proportion, the R values, G values and B values in each skin color mapping table each have ([255/X]+1) different values, so that the skin color mapping table only needs to record a total of ([255/X]+1)*([255/X]+1)*([255/X]+1) pixel values before being mapped and their corresponding ([255/X]+1)*([255/X]+1)*([255/X]+1) mapped pixel values, which can reduce the length of the skin color mapping table and improve computing efficiency. After the above compression, for any pixel to be mapped, the original pixel value Value$_{color}$ of the pixel to be mapped may be compressed by the same predetermined ratio X to the compressed pixel value [Value$_{color}$/X], and then the compressed pixel value [Value$_{color}$/X] is used as the pixel value [Value$_{color}$/X] before being mapped, and the pixel value after being mapped corresponding to the pixel value [Value$_{color}$/X] before being mapped is searched from the skin color mapping table. It can be understood that the mapped pixel value does not need to be compressed, that is, the R values, G values, and B values of the mapped pixel values are still in the range of 0 to 255, so that the found mapped pixel value can be directly used as a regular RGB pixel value.

Figure 5:
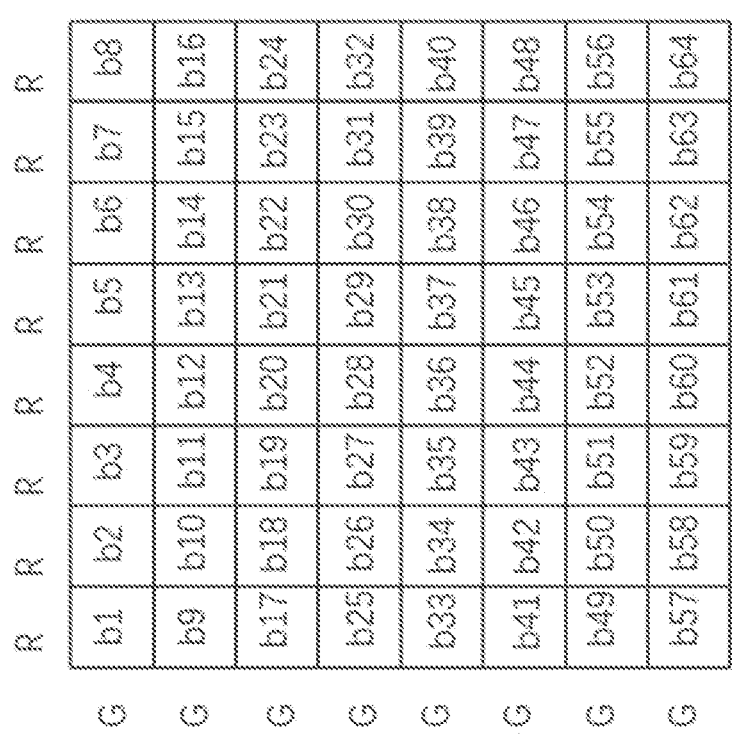

For example, after compressing the three channels of R values, G values and B values of the pixel values before being mapped in the RGB color space by 4 times, the value range of 0 to 255 of the R values, the G values and B values of the pixel values before being mapped is converted to the value range of 0 to 63, and a three-dimensional skin color mapping table LUT[B][G][R] as shown in FIG. 5 can be obtained. FIG. 5 shows B values under given R and G values of pixel values before being mapped in the RGB three-dimensional skin color mapping table, where b1 to b64 respectively represent the 64 B values in the range of 0 to 63. The length of the skin color mapping table is 64*64*64=262144, that is, the table records R values, G values and B values of 262144 pixel values before being mapped and the corresponding R values, G values and B values of 262144 pixel values after being mapped.

In the above embodiment of the RGB color space, although the input values of the three RGB channels are appropriately compressed to save storage and computation costs, the accuracy of the color mapping is reduced, and the length of the lookup table is still relatively long.

In another embodiment, the pixel values in each of the multiple skin color mapping tables are represented in the YUV color space.

In the YUV color space (also known as the YCbCr color space), each pixel value includes three channels of brightness (Y) value, blue component (Cb) value and red component (Cr) value, and each of the Y value, Cb value and Cr value has an original value range of 0 to 255. The Y value determines the brightness of the pixel, and the Cb and Cr values jointly determine the chromaticity of the pixel. In the YUV color space, the mapping process on the Y value can be performed separately, and the mapping process for the Cb value and the Cr value can be performed jointly. That is, the skin color mapping table in the YUV color space records N2 Y values before being skin color mapped and corresponding Y values after being skin color mapped, and records N3 Cb values and N3 Cr values before being skin color mapped and corresponding Cb values and Cr values after being skin color mapped, where N2 and N3 are positive integers. For any pixel to be mapped, the Y value of the original pixel value Value$_{color}$ of the pixel is used as the Y value of the pixel value before being mapped, and the corresponding Y value of the pixel value after being mapped can be found from the skin color mapping table. The Cb value and Cr value of the original pixel value Value$_{color}$ of the pixel are used as the Cb value and Cr value of the pixel value before being mapped, and the corresponding Cb value and Cr value of the pixel value after being mapped can be found from the skin color mapping table. In this way, the (Y, Cb, Cr) value of the mapped pixel value of the pixel can be determined.

Furthermore, in an embodiment, the Cb values and the Cr values of the pixel values before being color skin mapped in each skin color mapping table are respectively limited in a predetermined Cb value range and a predetermined Cr value range.

The above Cb value range a<Cb<b and Cr value range c<Cr<d can be set as the possible range of human skin color. Colors other than skin colors need not to be converted. That is, if the Cb value of a current pixel is beyond the Cb value range and/or the Cr value of the current pixel is beyond the Cr value range, it can be determined that the pixel does not belong to skin, and the pixel value after being mapped can be directly determined as the original pixel value before being mapped, without performing the color conversion. Under the original value range of 0 to 255, the Y values, Cb values and Cr values in each skin color mapping table each have 256 different values, so the skin color mapping table needs to record a total of 256+256*256=65792 pixel values before being mapped and corresponding 65792 pixel values after being mapped. After the Cb values and Cr values are respectively limited in the scopes of a<Cb<b and c<Cr<d, each skin color mapping table recodes 256 Y values, (b−a−1) Cb values, and (d−c−1) Cr values, so that the skin color mapping table only needs to record a total of (256+(b−a−1)*(d−c−1)) pixel values before being mapped and the corresponding (256+(b−a−1)*(d−c−1)) pixel values after being mapped. Compared with the above skin color mapping table in the RGB color space, this embodiment significantly reduces the length of the skin color mapping table and reduces the computational complexity, without compressing the color space, thereby having a higher color conversion accuracy, and finer and more smooth color change.

For example, based on the range of human skin color, the Cb value range and the Cr value range can be set as 77<Cb<127 and 133<Cr<173 respectively. Therefore, The Cb values in this range that actually needs to be converted include only 49 values, and the Cr values in this range include only 39 values. In the YUV color space, the image brightness corresponding to the Y channel can be processed separately, so that the total length of the skin color mapping table is 256+49*39=2167, that is, the table records 256 Y values before being mapped and their corresponding 256 Y values after being mapped, as well as 1911 pairs of Cb and Cr values before being mapped and their corresponding 1911 pairs of mapped Cb and Cr values.

In the above-mentioned method for adjusting skin colors of a portrait, instead of using a single skin color mapping table, multiple skin color mapping tables corresponding to multiple predetermined skin color categories are used according to multiple skin color category probabilities of the detected portrait image, to smoothly and comprehensively adjust the skin colors of the portrait according to different skin color conditions of the portrait, so that the skin color adjustment can be flexibly and accurately adapted to various skin color conditions.

It should be understood that although the various steps in the flow charts in FIGS. 2 to 4 are shown sequentially as indicated by the arrows, these steps are not necessarily executed sequentially in the order indicated by the arrows. Unless otherwise specified herein, there is no strict limitation on the order of these steps, and these steps can be executed in other orders. Moreover, at least some of the steps in FIGS. 2 to 4 may include multiple sub-steps or stages. These sub-steps or stages are not necessarily executed at the same time, but may be executed at different times. These sub-steps or stages are not necessarily performed sequentially, but may be performed alternately with at least a part of other steps or sub-steps or stages of other steps.

Figure 6:
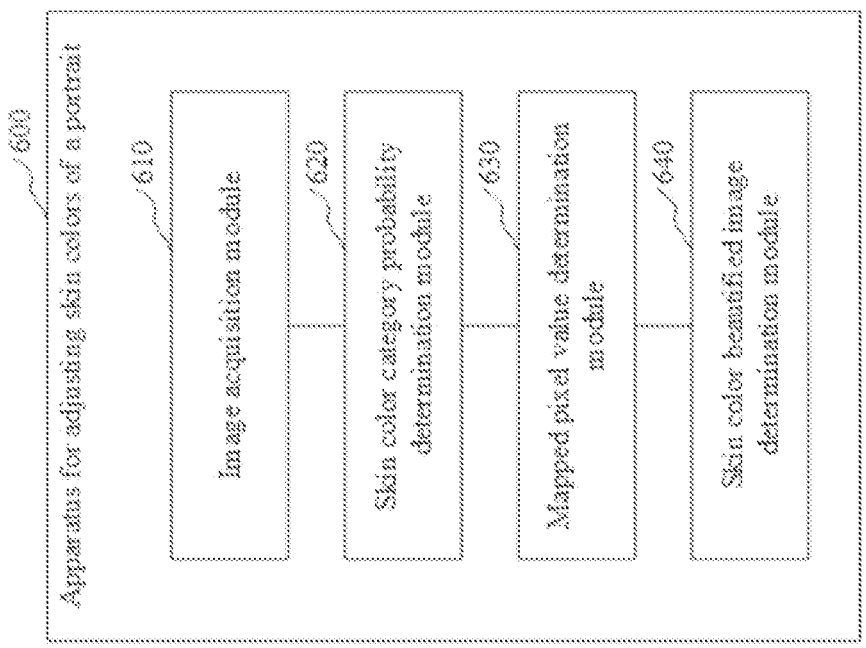
FIG. 6 is a structural block diagram of an apparatus for adjusting skin colors of a portrait according to an embodiment.

In an embodiment, as shown in FIG. 6, an apparatus 600 for adjusting skin colors of a portrait is provided, including: an image acquisition device 610, a skin color category probability determination module 620, a mapped pixel value determination module 630, and a skin color beautified image determination module 640.

The image acquisition module 610 is configured to acquire an initial portrait image to be adjusted.

The skin color category probability determination module 620 is configured to determine multiple skin color category probabilities that the initial portrait image respectively belongs to multiple skin color categories predetermined;

The mapped pixel value determination module 630 is configured to calculate a mapped pixel value of each pixel in the initial portrait image according to the multiple skin color category probabilities and multiple skin color mapping tables respectively corresponding to the multiple skin color categories.

The skin color beautified image determination module 640 is configured to determine a skin color beautified image based on the mapped pixel value of each pixel.

For the specific limitations of the apparatus 600 for adjusting skin colors of a portrait, one may refer to the above description of the method for adjusting skin colors of a portrait, which will not be repeated here. Each module in the apparatus 600 for adjusting skin colors of a portrait may be implemented all or in part by software, hardware or a combination thereof. The modules may be embedded in or independent of the processor in the electronic device in the form of hardware, or may be stored in the memory of the electronic device in the form of software, so that the processor can invoke the software to execute the operations of the modules.

Figure 7:
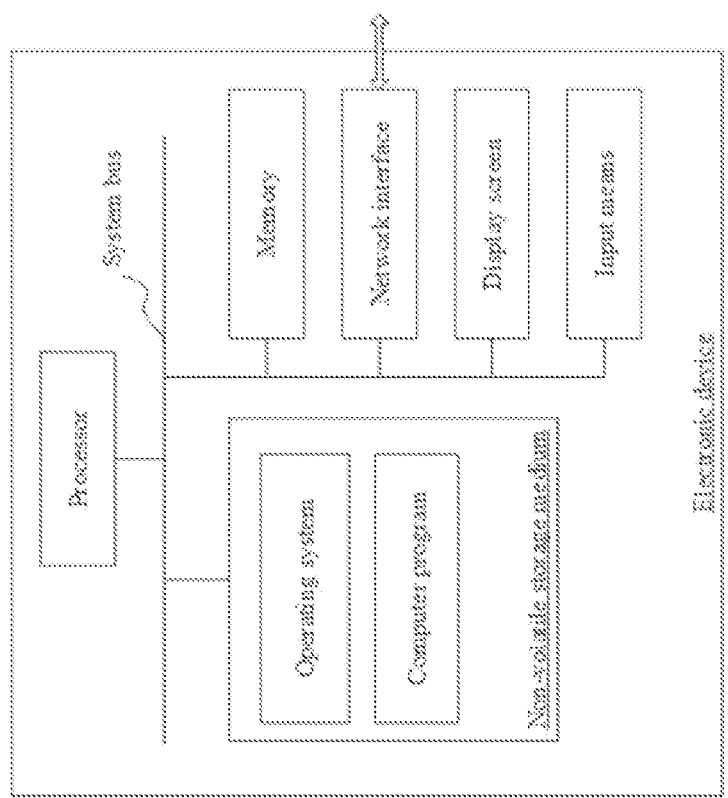
FIG. 7 is an internal structure diagram of an electronic device according to an embodiment.

In an embodiment, an electronic device is provided, which may have an internal structure as shown in FIG. 7. The electronic device includes a processor, storage means, a network interface, a display screen and input means connected through a system bus. The processor of the electronic device is used to provide calculation and control capabilities. The storage means of the electronic device includes a non-volatile storage medium and a memory. The non-volatile storage medium stores an operating system and computer programs. The memory provides an environment for the operations of the operating system and the computer programs in the non-volatile storage medium. The network interface of the electronic device is used to communicate with an external terminal through a network connection. The computer program is used to be executed by the processor to perform the method for adjusting skin colors of a portrait. The display screen of the electronic device may be a liquid crystal display screen or an electronic ink display screen. The input means of the electronic device may be a touch layer covering the display screen, or may be a button, a trackball or a touch pad provided on the housing of the electronic device, or may be an external keyboard, touchpad, or mouse.

Those skilled in the art can understand that FIG. 7 is only a block diagram of a partial structure related to the solution of the present disclosure, and does not constitute a limitation on the electronic device of the embodiments of the present disclosure. The electronic device may include more or fewer components than those shown in the figure, or have some components combined, or have a different arrangement of components.

In an embodiment, another electronic device is provided, including a memory and a processor. A computer program is stored in the memory. The processor performs the following steps when executing the computer program:
  acquiring an initial portrait image to be adjusted;
  determining multiple skin color category probabilities that the initial portrait image respectively belongs to multiple skin color categories predetermined;
  calculating a mapped pixel value of each pixel in the initial portrait image according to the multiple skin color category probabilities and multiple skin color mapping tables respectively corresponding to the multiple skin color categories; and
  determining a skin color beautified image based on the mapped pixel value of each pixel.

In other embodiments, when the processor executes the computer program, the processor performs steps of the method for adjusting skin colors of a portrait in any of the above embodiments.

In an embodiment, a computer-readable storage medium is provided, storing a computer program. The computer program, when being executed by a processor, performs the following steps:
  acquiring an initial portrait image to be adjusted;
  determining multiple skin color category probabilities that the initial portrait image respectively belongs to multiple skin color categories predetermined;
  calculating a mapped pixel value of each pixel in the initial portrait image according to the multiple skin color category probabilities and multiple skin color mapping tables respectively corresponding to the multiple skin color categories; and
  determining a skin color beautified image based on the mapped pixel value of each pixel.

In other embodiments, when the computer program is executed by the processor, the method for adjusting skin colors of a portrait in any of the above embodiments is implemented.

Those of ordinary skill in the art can understand that all or part of the processes in the methods of the above embodiments can be implemented through computer programs instructing related hardware. The computer programs may be stored in a non-volatile computer-readable storage medium. When the computer program is executed, the processes of the above method embodiments are implemented. Any memory, storage, database or other medium mentioned in the various embodiments in the present disclosure may include non-volatile and/or volatile memory. The nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration but not limitation, the RAM may be in various forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), a Rambus dynamic RAM (RDRAM), or the like.

The technical features of the above embodiments can be combined arbitrarily. For conciseness, not all possible combinations of the technical features in the above embodiments are described. However, as long as there is no contradiction in the combinations of these technical features, they should be considered as falling in the scope of the present disclosure.

The above embodiments only show some implementations of the present disclosure, the description of which is relatively specific and detailed, but should not be construed as limiting the scope of the patent for the invention. It should be noted that those skilled in the art can make several modifications and improvements without departing from the concept of the present disclosure, which all fall within the protection scope. Therefore, the protection scope is defined in the appended claims.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A method for adjusting skin colors of a portrait, comprising:
    acquiring an initial portrait image to be adjusted;
    determining that a plurality of skin color category probabilities of the initial portrait image is associated to at least one of a plurality of predetermined skin color categories;
    calculating a mapped pixel value for each pixel in the initial portrait image according to the plurality of skin color category probabilities and a plurality of skin color mapping tables based on the at least one of a plurality of predetermined skin color categories;
    acquiring the plurality of skin color mapping tables corresponding to at least one of the plurality of skin color categories:
    determining, for each pixel in the initial portrait image, a plurality of skin color mapped values by mapping an original pixel value of the pixel to the plurality of skin color mapping tables, and
    determining the mapped pixel value of each pixel by using the plurality of skin color categories probabilities as weights to perform a weighted summation on the plurality of skin color mapped values; and
    determining a skin color beautified image based on the mapped pixel value of each pixel.

2. The method according to claim 1, wherein the determining the skin color beautified image based on the mapped pixel value of each pixel comprises:
    determining, for each pixel in the initial portrait image, a skin probability that the pixel belongs to skin; and
    determining a skin color beautified pixel value of each pixel, based on the skin probability of each pixel and the mapped pixel value of each pixel.

3. The method according to claim 1, wherein each of the plurality of skin color mapping tables stores mapping relationships between pixel values before being skin color mapped and pixel values after being skin color mapped under a corresponding skin color category.

4. The method according to claims 1, wherein pixel values in each of the skin color mapping tables are expressed in a RGB color space; and
    each of the skin color mapping tables in the RGB color space recodes R values, G values and B values of a plurality of pixel values before being skin color mapped, and R values, G values and B values of the plurality of pixel values after being skin color mapped.

5. The method according to claim 4, wherein the R values, the G values and the B values of the pixel values before being skin color mapped in each of the skin color mapping tables are respectively compressed by a predetermined ratio.

6. The method according to claim 1, wherein pixel values in each of the skin color mapping tables are expressed in a YUV color space; and
    each of the skin color mapping tables in the YUV color space recodes Y values of a plurality of pixel values before being skin color mapped, and Y values of the plurality of pixel values after being skin color mapped, and recodes Cb values and Cr values of the plurality of pixel values before being skin color mapped, and Cb values and Cr values of the plurality of pixel values after being skin color mapped.

7. The method according to claim 6, wherein the Cb values and Cr values of the pixel values before being skin color mapped in each of the skin color mapping tables are respectively limited in a predetermined Cb value range and a predetermined Cr value range.

8. An electronic device, comprising a memory and a processor, wherein the memory stores a computer program, and the processor, when executing the computer program, performs the method according to claim 1.

9. An apparatus for adjusting skin colors of a portrait, comprising:
   an image acquisition module, configured to acquire an initial portrait image to be adjusted;
   a skin color category probability determination module, configured to determine a plurality of skin color category probabilities that the initial portrait image respectively belongs to a plurality of skin color categories predetermined;
   a mapped pixel value determination module, configured to calculate a mapped pixel value of each pixel in the initial portrait image according to the plurality of skin color category probabilities and a plurality of skin color mapping tables respectively corresponding to the plurality of skin color categories, and wherein the mapped pixel value determination module is further configured to:
   acquire the plurality of skin color mapping tables corresponding to at least one of the plurality of skin color categories,
   determine, for each pixel in the initial portrait image, a plurality of skin color mapped values by mapping an original pixel value of the pixel to the plurality of skin color mapping tables: and
   determine the mapped pixel value of each pixel by using the plurality of skin color categories probabilities as weights to perform a weighted summation on the plurality of skin color mapped values;
   and
   a skin color beautified image determination module, configured to determine a skin color beautified image based on the mapped pixel value of each pixel.

* * * * *